(12) United States Patent
Brutschin et al.

(10) Patent No.: US 8,300,380 B2
(45) Date of Patent: Oct. 30, 2012

(54) APPARATUS FOR DETERMINING AND/OR MONITORING A PROCESS VARIABLE

(75) Inventors: Wolfgang Brutschin, Schopfheim (DE); Klaus Ruf, Rheinfelden (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 12/735,087

(22) PCT Filed: Dec. 12, 2008

(86) PCT No.: PCT/EP2008/067368
§ 371 (c)(1),
(2), (4) Date: Jun. 15, 2010

(87) PCT Pub. No.: WO2009/077432
PCT Pub. Date: Jun. 25, 2009

(65) Prior Publication Data
US 2010/0309600 A1    Dec. 9, 2010

(30) Foreign Application Priority Data
Dec. 15, 2007   (DE) .......................... 10 2007 061 180

(51) Int. Cl.
*H01H 9/00* (2006.01)
*H01H 47/00* (2006.01)
*H01H 51/22* (2006.01)
*H01H 51/30* (2006.01)

(52) U.S. Cl. ........................ 361/160; 361/191; 361/194

(58) Field of Classification Search .................... 361/160
See application file for complete search history.

(56) References Cited

U.S. PATENT DOCUMENTS

| 3,585,457 A | 6/1971 | Zsander |
| 4,327,693 A | 5/1982 | Busser |
| 5,317,475 A * | 5/1994 | Siepmann ..................... 361/154 |
| 5,999,396 A | 12/1999 | Streich |

FOREIGN PATENT DOCUMENTS

| AT | 227 841 | | 6/1963 |
| DE | 3 843 339 | * | 6/1990 |
| DE | 38 40 991 A1 | | 6/1990 |
| DE | 38 43 339 A1 | | 6/1990 |
| DE | 40 26 427 C1 | | 2/1992 |
| DE | 92 12 266.3 | | 4/1993 |
| DE | 43 25 578 A1 | | 2/1995 |
| DE | 101 25 210 A1 | | 1/2003 |

* cited by examiner

*Primary Examiner* — Jared Fureman
*Assistant Examiner* — Lucy Thomas
(74) *Attorney, Agent, or Firm* — Bacon & Thomas, PLLC

(57) ABSTRACT

An apparatus for determining and/or monitoring at least one process variable. The apparatus includes at least one relay, at least one voltage source, and at least one voltage increasing unit. The relay, the voltage source and the voltage increasing unit as embodied, are matched to one another, and are connected with one another in such a manner that, when the voltage source supplies the relay with voltage for pull-in of the relay, the voltage increasing unit causes such an increase of the voltage applied to the relay, that the applied voltage corresponds at least to the pull-in voltage of the relay.

8 Claims, 5 Drawing Sheets

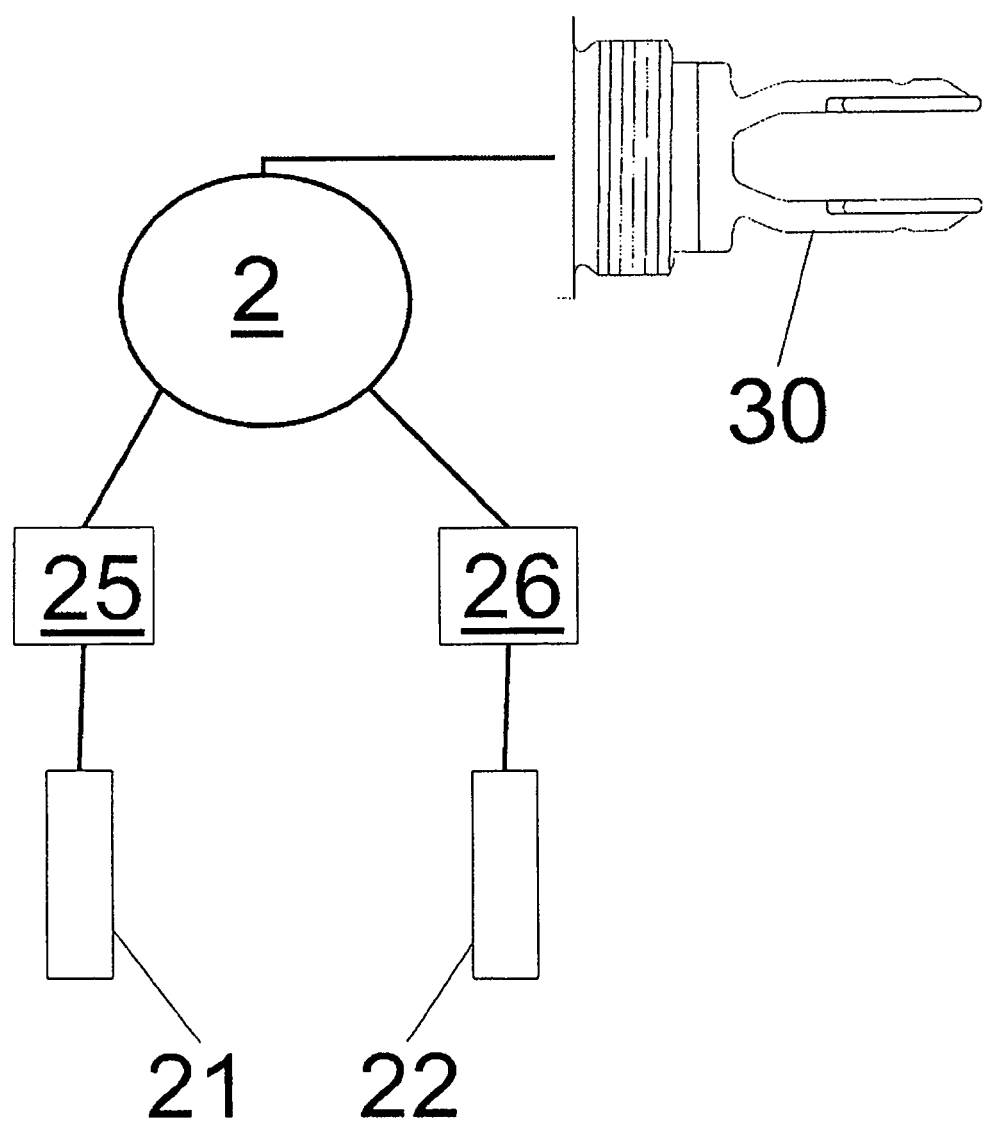

APPARATUS FOR DETERMINING AND/OR MONITORING A PROCESS VARIABLE

TECHNICAL FIELD

The invention concerns an apparatus for determining and/or monitoring at least one process variable. The apparatus includes at least one relay and at least one voltage source. The process variable is, for example, fill level, density, viscosity, pressure, flow, pH-value or temperature.

BACKGROUND DISCUSSION

In measuring devices of process, and automation, technology, relays are sometimes used, in order to signal the presence of switch states or operating states.

A basic requirement for the development of electronic circuits is always a good power balance, i.e. a power loss that is as low as possible. In the case of operation of a relay, a relatively large amount of power loss can be saved. The relay requires, indeed, a pull-in voltage, which corresponds to the nominal voltage of the relay; however, to hold the relay in the pull-in state, a much smaller voltage, the so called holding voltage, is required. This is clearly shown on the basis of a simple example. Let us say we have a relay with a nominal voltage of 24 V and a resistance of 1600Ω. In order to bring the relay securely into the pulled-in state, the relay is provided with 24 V. From that, an electrical current of 24 V/1600Ω=15 mA results. Associated with that is a power loss of P=15 mA*24 V=360 mW. In order to lessen this power loss, a so called holding circuit is often used, in the case of which the electrical current is lessened to the holding current. The high voltage of 24 V is kept, however, so that this voltage still negatively affects other circuit parts as regards the power balance. This is particularly the case with linear regulators connected thereafter.

SUMMARY OF THE INVENTION

An object of the invention is to provide a driver for a relay, in the case of which power loss is reduced.

According to the invention, the object is achieved by the features that at least one voltage increasing unit is provided, and that the relay, the voltage source, and the voltage increasing unit are embodied, are matched to one another and are connected with one another in such a manner that, when the voltage source supplies the relay with a voltage for pull-in of the relay, the voltage increasing unit causes such an increase of the voltage applied to the relay, that the applied voltage corresponds at least to the pull-in voltage of the relay. Through the voltage increasing unit, thus, the voltage, with which the relay is supplied in the case of pull-in, is increased in such a manner that it is at least equal to the pull-in voltage, i.e., that a pull-in of the relay, in fact, occurs.

An embodiment provides that the relay and the voltage source are embodied and are matched to one another in such a manner, that at least the voltage, with which the voltage source supplies the relay in the pull-in case, lies below the pull-in voltage of the relay. Accompanying this embodiment is the feature that the voltage increasing unit is embodied in such a manner that its produced voltage increase causes the voltage applied to the relay in the moment of the pull-in of the relay to lie above the pull-in voltage, or nominal voltage, of the relay. In an additional embodiment of the invention, the voltage, with which the voltage source supplies the relay in the holding case, i.e. after the pulling in of the relay and therefore in the closed state, is smaller than the pull-in voltage, but at least equal to the holding voltage. Thus, the power loss is lower.

An embodiment includes that the relay, the voltage source, and the voltage increasing unit are connected in series.

An embodiment provides that the voltage increasing unit is arranged between the voltage source and the relay.

In at least one of the two preceding embodiments and the arrangements associated with them, the voltage of the voltage source lies, thus, both on the relay, as well as on the voltage increasing unit. Thus, a voltage increase on the relay can be achieved for the moment of pull-in.

An embodiment provides that the voltage increasing unit has at least one electrical oscillatory circuit.

An embodiment includes that the oscillatory circuit involves an LC-oscillatory circuit.

In one variant, an oscillatory circuit is thus used as storage for the electrical voltage, which is transmitted to the relay according to the transient behavior of the oscillatory circuit. In one embodiment, the voltage source is, in such case, connected with the oscillatory circuit and the relay. In an alternative embodiment, the oscillatory circuit is contacted with an additional voltage source.

In a second variant, the voltage increasing unit is embodied as follows:

An embodiment provides that the voltage increasing unit has at least one voltage storing unit.

An embodiment includes that the voltage storing unit is embodied and arranged in such a manner, that in the pull-in case of the relay, the voltage source and the voltage storing unit are connected in series.

An embodiment provides that the voltage storing unit includes at least one capacitor.

For all embodiments, it can thus be formulated: The invention reduces the power loss by using a smaller voltage as operating voltage, i.e. for the holding state, and in that the voltage for the relay is increased at the moment of pull-in to the required nominal voltage by the particular voltage increasing unit being used.

An embodiment provides that at least a first relay and at least a first voltage increasing unit are provided, that at least a second relay and at least a second voltage increasing unit are provided, and that the first voltage increasing unit and the second voltage increasing unit are embodied differently. In this embodiment, the measuring device has available two relays which signal either different states or the same state redundantly. For safety directed applications, it can be required that essential components of a field device be embodied redundantly and diversely. In this embodiment of the apparatus for determining and/or monitoring a process variable, the two relays are connected, each with a differently embodied, thus diverse, voltage increasing unit. The voltage increasing units especially implement, in each case, another method for increasing the voltage. For example, one voltage increasing unit includes the oscillatory circuit discussed above according to at least one embodiment, and the second voltage increasing unit has available the aforementioned voltage storing unit. In the one variant, thus, the transient behavior of the oscillatory circuit is used, and in the other variant the addition of the capacitor voltage is used, in order to produce a voltage increase on the relay.

BRIEF DESCRIPTION OF THE DRAWINGS

The invention will now be explained in greater detail on the basis of the appended drawing, Figures of which show as follows:

FIG. 5 is a part of a measuring device of the invention with two relays.

DETAILED DISCUSSION IN CONJUNCTION WITH THE DRAWINGS

Figure 1:
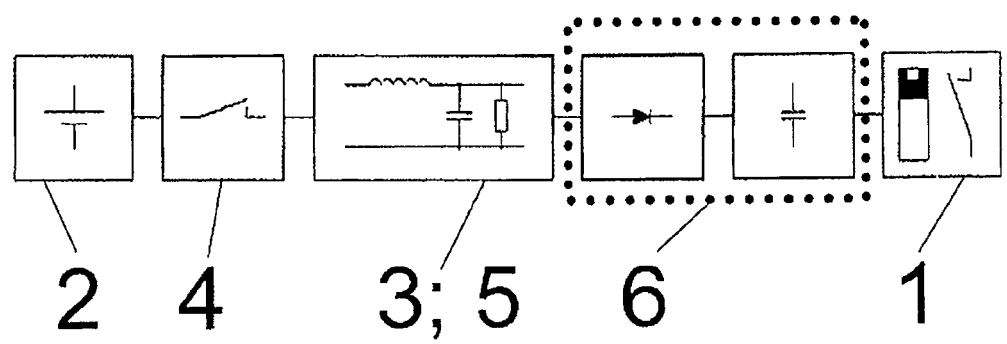
FIG. 1 is a block diagram of some components of the apparatus of the invention with a first variant of the voltage increasing unit.

FIG. 1 shows a block diagram of the circuit. The additional components of the apparatus for determining and/or monitoring a process variable, such as, for example, the actual sensor unit, are not shown.

The voltage source 2 is connected via a switch 4 with the relay 1. If it results, for example, from the measuring of the process variable, that a limit value was exceeded, then the relay 1 is pulled-in by the actuating of switch 4. If the process variable concerns, for example, the fill level of a medium—e.g. a liquid or a bulk good—in a container, and if the sensor unit involves an oscillatory fork, a single rod, or a membrane oscillator, then, for example, the exceeding of a fill level can be recognized by evaluating the characterizing variables of the oscillations of the sensor unit.

The relay 1 is pulled-in by a voltage being applied on it, which is equal to or larger than its nominal voltage, or its pull-in voltage. In order to lessen the loss at the relay 1 in the holding state, the voltage source 2 is matched in such a manner to the relay 1, that the voltage, with which the source 2 supplies the relay 1, lies below its pull-in voltage.

In order that the relay 1 does, in fact, pull in at the moment of pull-in, the oscillatory circuit 3 is provided here as voltage increasing unit 5, in the case of which involved here is an LC-oscillatory circuit having a coil, a capacitor and a resistor. The coil and the capacitor are, in such case, connected in series. The resistor is arranged parallel to the capacitor. This oscillatory circuit 3 is likewise connected with the voltage source 2 and lies in series between the source 2 and the relay 1. In this way the voltage of the voltage source 2 lies both on the relay 1, as well as on the voltage increasing unit 5, i.e. in the ideal case, there is a doubling of the voltage on the relay 1. Behind the oscillatory circuit 3, a rectifier 6 is provided, composed of a blocking diode and a smoothing capacitor, which produces a smooth curve from the oscillating signal of the oscillatory circuit 2. The smooth curve falls corresponding to the attenuation of the amplitude in the oscillatory circuit 3.

In this embodiment of FIG. 1, the transient behavior of an LC-oscillatory circuit is thus made use of. Through the right choice of the components, the oscillatory circuit is excited and begins to oscillate at the turn-on of the voltage. By the following rectification, the DC portion is filtered via a capacitance and fed to the relay as pull-in voltage. By corresponding dimensioning, the amplitude and settling time can be optimized corresponding to the requirements for the switching behavior of the relay. The oscillation frequency of the oscillatory circuit 3 is matched especially on the inertia of the relay 1. For the pulling in of the relay 1, especially only one pulse is used.

Figure 2:
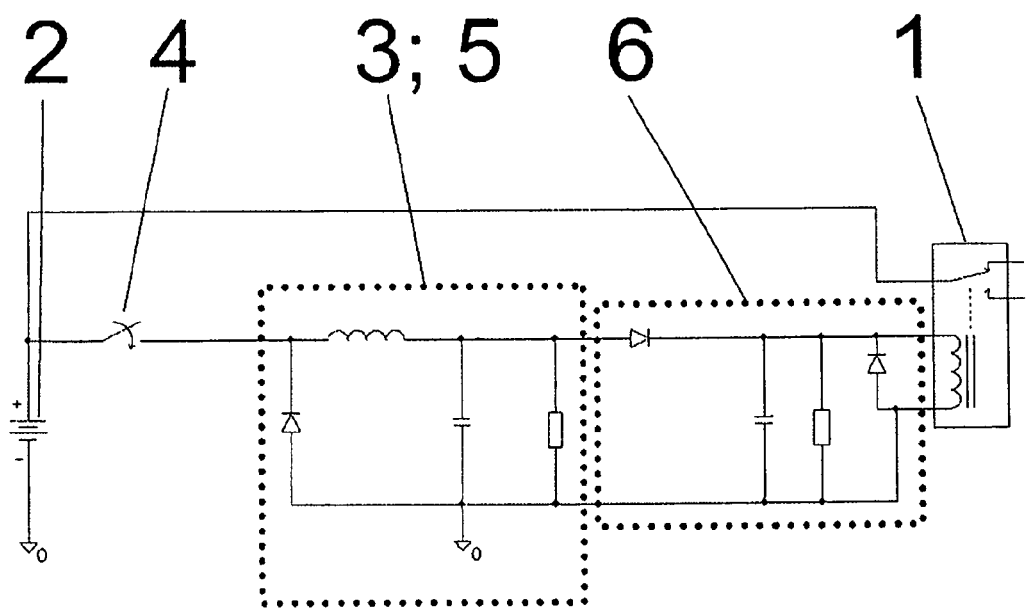
FIG. 2 is a detailed representation of the circuit of the first variant.

In FIG. 2, the individual components of the circuit of FIG. 1 are presented in detail. The voltage source 2 and the oscillatory circuit 3 are connected here with the same reference potential, ground. In the oscillatory circuit, a diode is still arranged between the switch 4 and the coil and serves as a flyback diode, important for the moment of switch off. The rectifier 6 produces a smoothed signal from the oscillatory signal of the oscillatory circuit via two diodes, a capacitor, and a resistor. The maximum amplitude results, in such case, at the moment when the switch 4 is closed, i.e. at the instant when the relay 1 should pull-in. Through the attenuation, the voltage then becomes smaller. The attenuation and the resonance frequency are, in such case, to be so chosen, that the relay 1 can switch well and reliably. An advantage of this variant lies therein, that essentially only one switch is required for producing the voltage increase, wherein it especially involves the switch that is already required for the switching of the relay.

Figure 3:
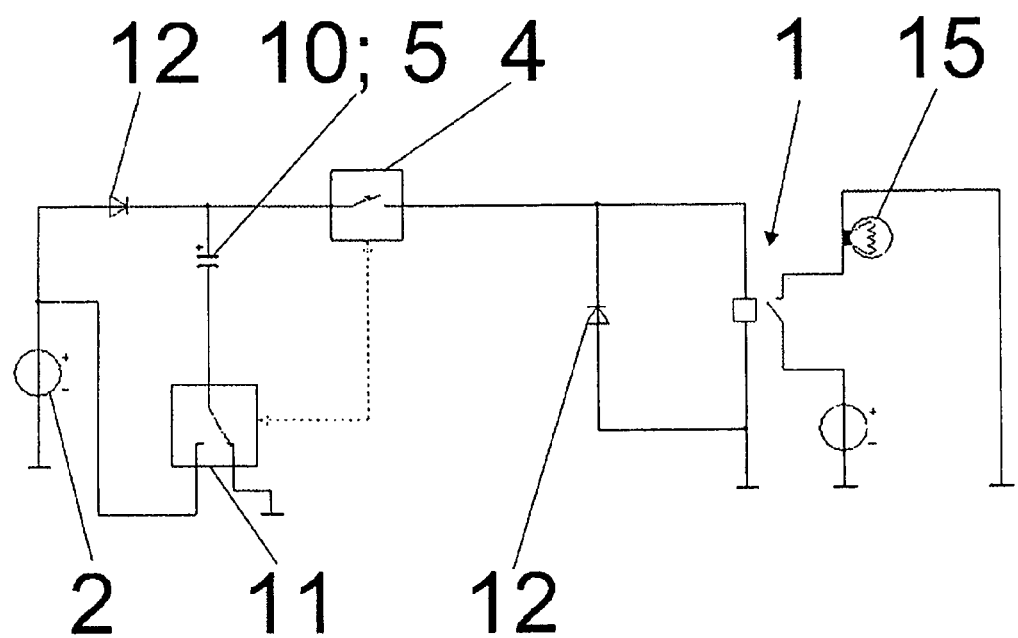
FIG. 3 is a second variant for the voltage increase with a dropped-out relay.
Figure 4:
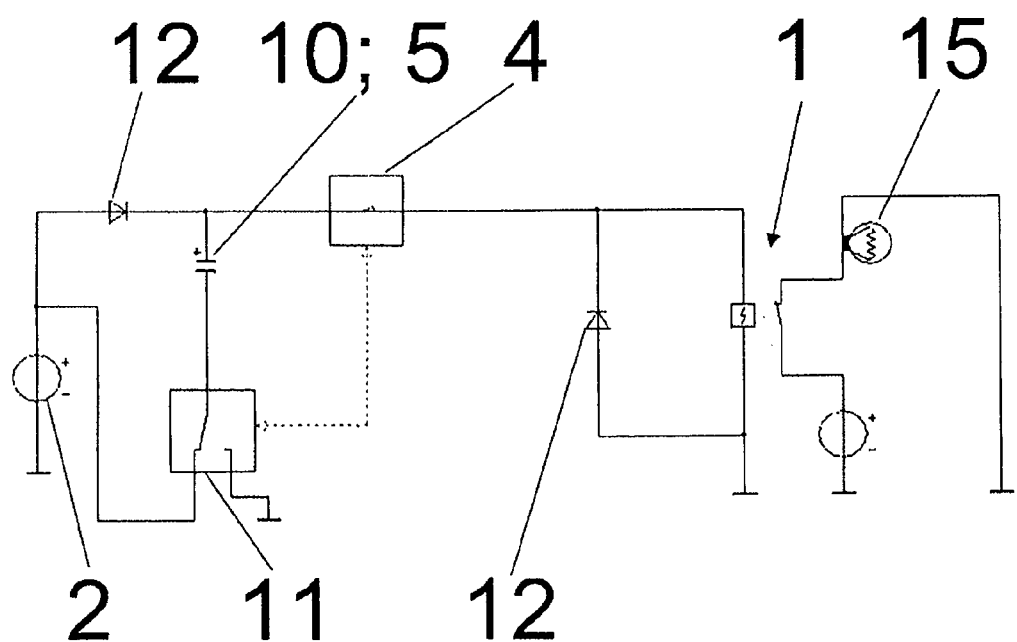
FIG. 4 is the embodiment of FIG. 3 with a pulled-in relay.

In FIGS. 3 and 4, a second variant of the voltage increasing unit 5 is presented.

For the voltage increasing unit 5, a voltage storing unit 10 is here provided, in which it here involves, in particular, a capacitor. The capacitor 10 is connected here, on the one hand, with the voltage source 2 and, on the other hand, with a reference potential. The switch 4 for the relay 1 is open in FIG. 3. The voltage source 2, the capacitor 10 and the relay 1 are connected in series. Behind the relay 1, an LED 15 is provided, which optically displays to the observer, whether the relay is pulled-in. FIG. 4 shows the switch 4 for the relay 1 closed, i.e. for example, a fill level has been reached by a medium, or another state has occurred, which is to be signaled by the switching of the relay 1. Connected with the switch 4 is the recharging switch 11, which connects the capacitor 10 with the voltage source 2. I.e. the voltage source 2 and the capacitor 10 are switched in series and correspondingly the sum of both voltages lies on the relay, which pulls in and here, for example, lights the LED 15. In an alternative embodiment, the capacitor 10 is connected with an additional voltage source, so that in sum also another voltage results for the relay 1.

This second variant of the voltage increase can also be described as follows: The capacitor 10 lies via a decoupling diode 12 at the operating voltage of the voltage source 2 and is charged to this voltage. The relay 1 is dropped out (FIG. 3). By a corresponding sensor signal, the relay operation is, on the one hand, activated. At the same time, the recharging switch 11 is switched, so that the low end of the capacitor 11 lies at the voltage source. In this way, the voltage of the capacitor 10 and the voltage of the voltage source 2 add together. If the relay 1 is switched on, the capacitor 10 is discharged down to the difference between the supply voltage and the voltage falling on the diode 12. This holding voltage is sufficient to hold the relay 1 safely in the pulled in state. If the input signal brings the relay 1 to drop out, then the recharging switch 11 is brought back into the position, in which the capacitor 10 is connected with the reference potential, ground, whereby the capacitor 10 can recharge itself. The voltage pulse on the relay 1 depends on the charging capacitance 10 as well as on the discharge current through the relay 1. On the whole, a voltage pulse should fall away between about 20 ms and 50 ms. This time is sufficient to switch the relay 1 safely. By the circuits of FIGS. 3 and 4, a low operating voltage can be selected; in the most favorable case, it is half the nominal voltage of the relay 1. In this second variant two switches are required.

FIG. 5 shows a part of the apparatus of the invention. For sensor unit 30, as an example, an oscillatory fork is provided here, which serves for determining and monitoring such process variables as, for example, fill level, density or viscosity. The voltage source 2 is connected here with two relays 21, 22.

These show, for example, two different switch states or, each the same switch state. The relays can also serve to display an operating state of the measuring device.

Each relay 21, 22 is connected with its own voltage increasing unit 25, 26. In such case, for example, the first voltage increasing unit 25 is executed according to the aforementioned first variant, i.e. an oscillatory circuit serves for the voltage increase, and the second voltage increasing unit 26 has the switched capacitor as voltage storing unit.

List of Reference Characters
1 relay
2 voltage source
3 oscillatory circuit
4 switch
5 voltage increasing unit
6 rectifier
10 voltage storing unit
11 recharging switch
12 diode
15 LED
21 first relay
22 second relay
25 first voltage increasing unit
26 second voltage increasing unit
30 sensor unit

The invention claimed is:

1. An apparatus for determining and/or monitoring at least one process variable, comprising:
at least one relay;
at least one voltage source;
at least one voltage increasing unit and
a switch, wherein:
said at least one voltage source provides a voltage which is smaller than a voltage for pull-in of said relay;
said at least one voltage source is connected via said switch with said at least one relay;
said at least one voltage increasing unit includes at least one electrical oscillatory circuit or at least one voltage storing unit; and
said at least one relay, said at least one voltage source, and said at least one voltage increasing unit are embodied, matched to one another and connected with one another in such a manner that, when said switch is activated, such that said at least one voltage source and said at least one voltage increasing unit supply said at least one relay with voltage for pull-in, wherein said at least one voltage increasing unit produces a voltage additional to the voltage provided by said voltage source, thereby causing such an increase of the voltage applied to said at least one relay that the applied voltage corresponds at least to the pull-in voltage of said at least one relay and that, in the holding case after the pulling in of the relay, the voltage being supplied to the relay is smaller than the pull-in voltage.

2. The apparatus as claimed in claim 1, wherein:
said at least one relay and said at least one voltage source are embodied and matched to one another in such a manner, that at least the voltage, with which said at least one voltage source supplies said at least one relay in the pull-in case, lies below the pull-in voltage of said at least one relay.

3. The apparatus as claimed in claim 1, wherein:
said at least one relay, said at least one voltage source and said at least one voltage increasing unit are connected in series.

4. The apparatus as claimed in claim 3, wherein:
said at least one voltage increasing unit is arranged between said at least one voltage source and said at least one relay.

5. The apparatus as claimed in claim 1, wherein:
said oscillatory circuit is an LC-oscillatory circuit.

6. The apparatus as claimed in claim 1, wherein:
said at least one voltage storing unit is embodied and arranged in such a manner that, in the case of pull-in of said at least one relay, said at least one voltage source and said at least one voltage storing unit are connected in series.

7. The apparatus as claimed in claim 1, wherein:
said at least one voltage storing unit comprises at least one capacitor.

8. The apparatus as claimed in claim 1, further comprising:
at least a first relay;
at least a first voltage increasing unit;
at least a second relay; and
at least a second voltage increasing unit are provided, wherein:
said at least a first voltage increasing unit and said at least a second voltage increasing unit are embodied differently.

* * * * *